United States Patent [19]

Cestero

[11] Patent Number: 4,651,525

[45] Date of Patent: Mar. 24, 1987

[54] PISTON RECIPROCATING COMPRESSED AIR ENGINE

[76] Inventor: Luis G. Cestero, G.P.O. Box 404, San Juan, P.R.

[21] Appl. No.: 792,525

[22] Filed: Oct. 29, 1985

Related U.S. Application Data

[63] Continuation-in-part of Ser. No. 697,889, Nov. 7, 1984, abandoned, which is a continuation of Ser. No. 462,938, Feb. 1, 1983, abandoned, which is a continuation of Ser. No. 261,717, May 8, 1981, abandoned.

[51] Int. Cl.⁴ .............................................. F16D 31/02

[52] U.S. Cl. ........................................ 60/416; 60/407; 60/413

[58] Field of Search ................. 60/370, 407, 408, 409, 60/413, 415, 416

[56] References Cited

U.S. PATENT DOCUMENTS 3,765,180 10/1973 Brown .................................. 60/415
3,925,984 12/1975 Holleyman ............................ 60/370
4,404,800 9/1983 Penney ............................. 60/415 X

*Primary Examiner*—Stephen F. Husar
*Attorney, Agent, or Firm*—Scrivener Clarke Scrivener & Johnson

[57] ABSTRACT

An engine of the reciprocating piston type is provided in which the motive power for power generating pistons is compressed air stored in compartments forming part of the engine which are replenished with compressed air by a piston operating in a cylinder which receives exhaust air from the power cylinders, supplemented by air provided by an externally powered compressor. There are two power pistons operating in unison between top and bottom dead center, but with their power and exhaust strokes alternating. Spent air is exhausted through timing valves to the replenishing cylinder and compressed with the supplemental air into a first chamber from which the compressed air flows through check valves to the compartments. Engine speed is controlled by a throttle valve regulating the flow of air from the first chamber to atmosphere.

6 Claims, 2 Drawing Figures

PISTON RECIPROCATING COMPRESSED AIR ENGINE

RELATED CASES

This application is a continuation-in-part of my co-pending application Ser. No. 697,889, filed Nov. 7, 1984, now abandoned, which was a continuation of my co-pending application Ser. No. 462,938, filed Feb. 1, 1983, for Compressed Air Engine, now abandoned, which was a continuation of my co-pending application Ser. No. 261,717 filed May 8, 1981 for Eolic Superposed Cylinder Engine, which is now abandoned.

SUMMARY OF THE INVENTION

An ecologically superior substitute for the internal combustion engine is provided, consisting of a piston-type engine in which stored in a reservoir forming part of the engine and is supplied successively to two power cylinders each of which operates in a four-stroke cycle, and after the power stroke exhausts to a transfer cylinder which, assisted by an external source of energy, returns compressed air to the reservoir to continue the operative cycle of the engine. Valve means operated by the engine crankshaft are provided to regulate the operative cycle of each of the cylinders.

DESCRIPTION OF THE PREFERRED EMBODIMENT OF THE INVENTION

The Engine Components

Figure 2:
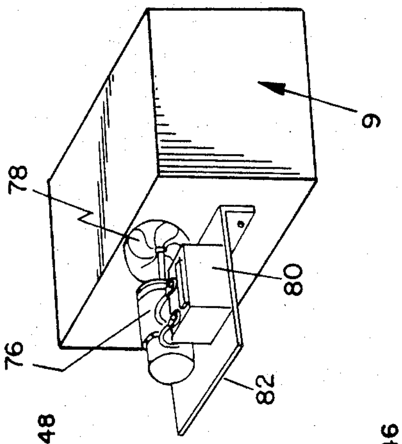
FIG. 2 is a perspective view of the rotary compressor and its supporting means.
Figure 1:
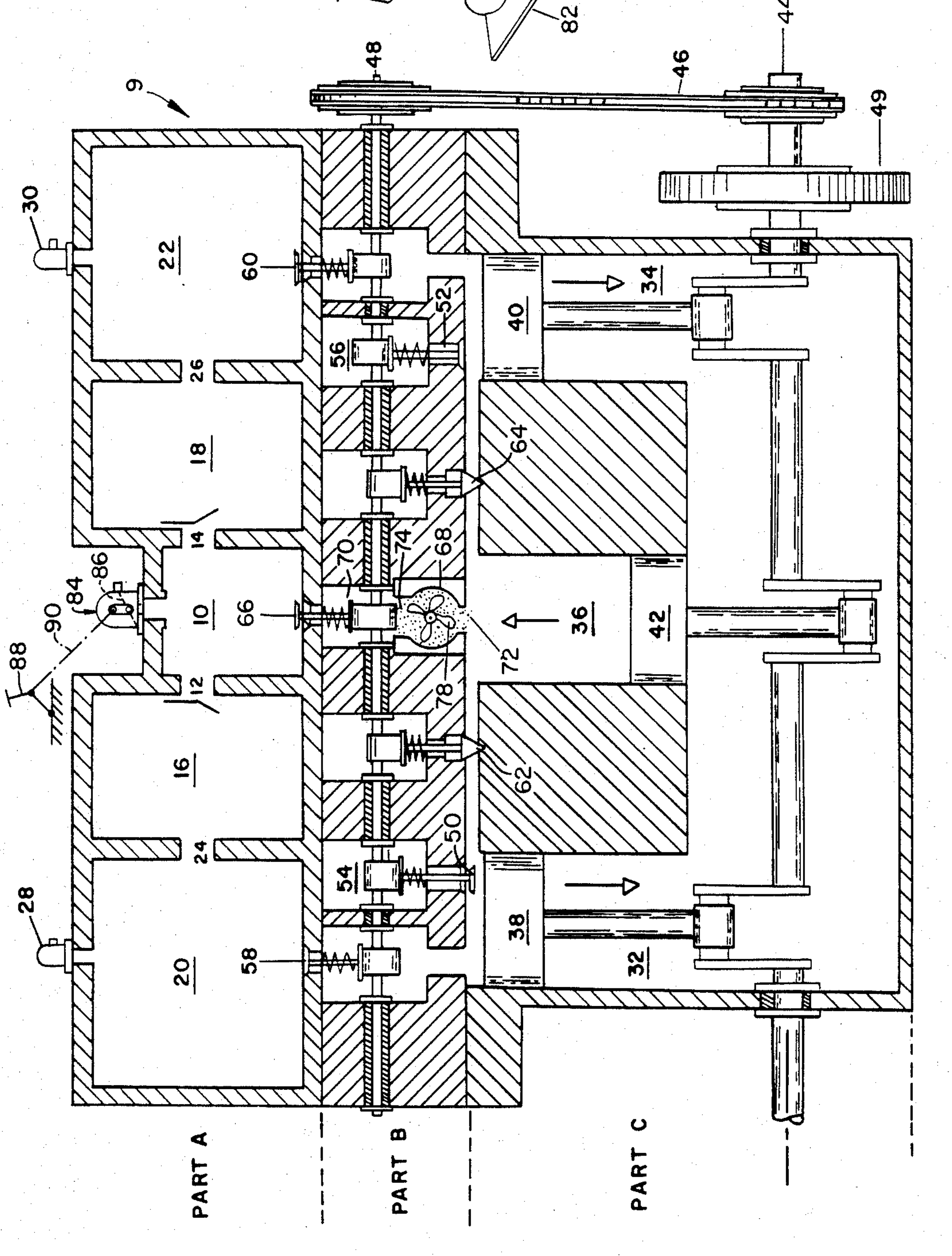
FIG. 1 is a vertical sectional view of the compressed air engine provided by the invention, showing the pistons and other parts of the engine.

The preferred embodiment of the engine provided by the invention is disclosed in the drawings and comprises, in general, an engine block within which there are three tiers of operative parts which are denominated from top to bottom as Parts A, B and C. Part A houses the air reservoir means, Part B houses the valve operating camshaft and the valves which control the operative cycle of the engine, and Part C houses the operative cylinders, pistons and crankshaft. Part B also includes, an externally powered source of energy, a compressor which assists in the transfer of exhaust air from the power cylinders to the transfer cylinder and from that cylinder to the air reservoirs.

The reservoir tier A comprises a central chamber 10 connected through outwardly pivoted flap valves 12, 14 to intermediate chambers 16, 18 which are positioned at the opposite sides of chamber 10, and which in turn are connected, respectively, to outer chambers 20, 22 through open ports 24, 26. Chamber 20 may be vented to air through valve 28 and chamber 22 through valve 30.

Lower tier C comprises power cylinders 32, 34 which are positioned under outer reservoir chambers 20, 22, respectively, and centrally located transfer cylinder 36 which is positioned beneath central reservoir chamber 10.

As shown in the drawings pistons 38, 40 of power cylinders 32-34 are on their top dead center and always work in conjunction, that is in the same direction and at the same time, but piston 38 works on an admission-compression-work-exhaust cycle while piston 40 works on a work-exhaust-admission-compression cycle. Piston 42 of transfer cylinder 36 always moves in the direction opposite to that of pistons 38, 40 of power cylinders 32, 34. It will be seen that the connections of the three pistons to the crankshaft provide the described relationship of their movements. The three pistons are connected to crankshaft 44 which at its one end may be connected to an external electric starting motor (not shown) and is also connected through a connecting belt 46 or the like to the camshaft 48. The crankshaft also carries a flywheel 49.

Middle tier B lies between the air compartments of Part A and the cylinders of Part C and houses the camshaft 48, the cams mounted on it, and the valves which are operated by the cams to connect the cylinders to the compressed air chambers, to each other, and to the surrounding ambient air. These valves and their functions are described as follows:

a. Intake valves 50, 52 which are operative to admit ambient air from chambers 54, 56 into the power cylinders 32, 34.

b. Central transfer valves 58, 60 through which compressed air is transferred from air compartments 20, 22 to the power cylinders 32, 34, respectively.

c. Exhaust valves 62, 64 which are in open position when the motive fluid is transferred from power cylinders 32, 34, respectively into the transit cylinder 36 and are in closed position during the admission, compression and work strokes of the power cylinders.

d. Intermediate transfer valve 66 which is in closed position when the motive fluid of the power cylinders 32, 34 is passed into the transit cylinder and is in open position to air chamber 10 on the exhaust stroke of the piston 42 of the transfer cylinder 36.

Each valve is positioned within a housing as shown in the drawings, and all are of the common spring loaded type and are operated by cams on camshaft 48, to cause piston operation in predetermined sequence.

Below the chamber 70 that houses the cam operator for valve 66, a rotary compressor is mounted within a cylindrical aperture that extends transversely of the engine block. This compressor is operative to move air out of the power cylinder. An overlapping of the exhaust and admission strokes can occur because the first is the last stroke and the second starts a new sequence of events. If compressed air remains in the power cylinders at the end of their respective exhaust strokes; this compressed air will have an exhaust-outside effect interfering with the intake effect of the admission stroke. The compressor assists in the transference of the total mass of exhaust compressed air from power cylinders 32, 34 to the transfer cylinder 36, preparing them for new admission strokes. The compressor will also be operative to move the exhaust air in the transfer cylinder back to central reservoir 10 through valve 66. The compressor is operated by an electric motor 76 which is energized by battery 80, and these parts may be externally mounted on the engine, as shown in FIG. 2.

The Air Cylinders and Compartments

The engine comprises two identical operating units, one comprising air compartments 10, 18, 22, power cylinder 34, transfer cylinder 36, and the associated valve means, and the other comprising air compartments 10, 16, 20, power cylinder 32, transfer cylinder 36, and the associated valve means. Only one of these units and its operation is described hereinafter in detail.

Each of power cylinders 32, 34 has an area of 50 sq. cms., a height of 10 cms. and has a volume of 500 cc. Transfer cylinder 36 also has an area of 50 sq. cms., a height of 10 cms. and a volume of 500 cc.

The air compartments 10, 16, 20 are the most important energy source for power cylinder 32, and they are placed adjacent each other and on top of cylinders 32, 36. Their respective heights, areas and volumes are as follows:

| Compartment | Area in Base | Height | Volume |
|---|---|---|---|
| 10 | 50.00 Sq. Cms. | 10 Cms. | 500 cc |
| 16 | 66.666 Sq. Cms. | 15 Cms. | 1,000 cc |
| 20 | 100.00 Sq. Cms. | 15 Cms. | 1,500 cc |
| | 216.666 Sq. Cms. | | 3,000 cc |

The importance of the dimensions of the air compartments is not due to their position or design but to the fact that they provide a definite, precise energy reservoir volume. For the described preferred embodiment of the engine, the design of the air compartments can be changed but their overall volume and the air to be compressed in them must remain the same. When compartments 10-16-20 are occupied by 3,000 cc. of normal air (to differentiate it from compressed air), their thermodynamic properties are as follows:

| | |
|---|---|
| Combined volume of the compartments and volume of normal air in them | 3,000 cc |
| Density of normal air | 0.0013 gr./cc |
| Mass (volume × density) | 3.90 grs. |
| Normal atmospheric pressure | 1 atmosphere/Sq./Cm. |
| Temperature (assumed) | 0° C. = 273° K. |

If with energy from the outside, 91,000 cc of normal air are introduced into the three air compartments, a compressed air system with properties 31.33 times normal is formed. The new thermodynamic properties of the compressed air system are the following:

| | |
|---|---|
| Combined volume of the compartments | 3,000 cc |
| New volume of air squeezed in compartments | 94,000 cc |
| Mass: V × D or 94,000 cc × 0.0013 gr./cc | 122.2 grs. |
| Density of the compressed air: $M \div V = \frac{122.2 \text{ grs}}{3{,}000 \text{ cc}}$ | 0.0407 gr./cc |
| Pressure[1] | 124.3 atms./sq. cm. |
| Temperature[1] | 1082° K. = 809° C. |

[1]Calculated by Sears-Zemansky's equation.

These compartments are the most important (although not the only) energy source of the engine. The pumping of 91,000 cc of ambient-normal air into the air compartments can be done by two means:

1. The engine may have an electric starting motor as all internal combustion engines have. This auxiliary motor will move pistons 38 and 40, 186 times until 91,000 cc of air are brought from the outside and stored in the air compartments 10, 16, 20, or
2. An air compressor could pump 91,000 cc of air into the compartments through a valve.

Operation of the Engine

How the Engine Works

The subject power plant is a three cylinder-piston-reciprocating engine that works in a four cycles sequence as follows:

| Cylinder | Sequence of Events[1] 1 | | 2 | | 3 | | 4 |
|---|---|---|---|---|---|---|---|
| Piston of Cyl. 32 | A | — | C | — | W | — | E |
| Piston of Cyl. 36 | T | — | TW | — | T | — | TW |
| Piston of Cyl. 34 | W | — | E | — | A | — | C |

[1]A = Admission
C = Compression
T = Transference
W = Work
E = Exhaust
TW = Transference-work As mentioned, pistons 38-40 of power cylinders 32-34 are on their top dead center and they work in conjunction and at the same time, although on a different stroke's order. For that reason, on event 1 they perform admission and work strokes respectively because these are descending motions; on the second event they perform compression and exhaust strokes which are ascending movements. On the third and fourth events, these strokes are conversely repeated when performing work-admission movements and exhaust-compression strokes respectively.

Piston 42 of Cylinder 36 moves contrary to power cylinders 32-34. During event number one it moves in an upwards motion to assist compressor 76 transfer the exhaust gases of cylinder 32 back to central chamber 10. On event number two piston 42 of cylinder 36 moves downwards to receive the mass of exhaust air of cylinder 34. This exhaust air is compressed air containing most of the heat energy that executed the previous work stroke of cylinder 34. Because it is a descending stroke it is not only a transference stroke but a work stroke as well. On events 3 and 4, these strokes are conversely repeated.

It should be noted that during sequence of events No. 1 (vertically viewed); cylinder 34 performs a work stroke that has a carrying effect upon cylinders 32-36; which are executing their admission-exhaust strokes respectively. This carrying effect is part of the reciprocating condition of the proposed engine and help perform these strokes.

During sequence of events No. 2; cylinder 36 performs a transference-work stroke that also has a carrying effect upon cylinders 32-34; which are executing their compression-exhaust strokes respectively.

During sequence of events No. 3, it is cylinder 32 that performs a work stroke; with the previously mentioned effect upon cylinders 36-34; which are executing their transference-admission strokes; and Finally, during sequence of events No. 4 cylinder 36 again performs a transference-work stroke with a carrying effect upon cylinders 32-34 which are executing their exhaust-compression strokes respectively.

In summary, the proposed engine executes four work strokes, as follows:

Two by the power cylinders 32-34 that delivers power to the crankshaft; part of which goes to the outside to make a change in the existing conditions; and part is stored in the flywheel to be returned to the crankshaft for the performance of the non-power producing strokes of the engine; and Two by the transfer cylinder 36 that has a reciprocating effect on the engine as they help perform the corresponding non-power producing strokes.

The engine is similar to the internal combustion Diesel engine in that it admits air alone during the admission strokes and compresses it to a second volume. In this engine it is compressed by a 9:1 ratio, while Diesel engines compress the air to higher ratios, sometimes 18:1. After this, it is entirely different because the proposed engine does not require fuel and no combustion process takes place: it requires compressed air from the air compartments to triple the thermodynamic factors in the active cylinders and to keep these factors constant during the work stroke. The Diesel engine (as the gasoline engine and all internal combustion engines) throw the exhaust—contaminating gases to the surrounding atmosphere while the engine of this invention re-circulates the exhaust air to the air compartments and only the excess non-contaminating air received during the admission stroke of the power cylinder is rejected or returned to the surrounding atmosphere. It is remembered that the Diesel and all internal combustion engines do not recirculate the exhaust gases, not because they are not wanted but because these contaminating gases lack oxygen that is the active element in the chemical combustion process.

Scheme of Operation

As mentioned, the subject Engine comprise two identical operating units: one comprising air compartments 10-18-22, power cylinder 34, transfer cylinder 36 and the associated valve means; and the other comprising air compartments 10-16-20, power cylinder 32, transfer cylinder 36 and the associated valve means.

To simplify this disclosure, only the combined operation of power cylinder 32, transfer cylinder 36, air compartments 10-16-20 and the associated valve means will be described; as the other operating unit works exactly the same; although at different times.

Thermodynamic Assumptions

Two basic assumptions have to be made in order to explain the operation of one of this working unit:

1. With valve 14 assumed closed to conserve the thermodynamic properties of compartments 10-16-20; it is presumed that an auxiliary electric motor (not shown in the drawings) has moved crankshaft 44 through 186 complete rotations; admitting ambient air through intake valve 50 into air compartments 10-16-20 until they are filled with 94,000 cc of ambient air forming a compressed air system with the following thermodynamic properties:

| | Air compartments 10-16-20 |
|---|---|
| Combined volume | 3,000 cc |
| Mass | 122.2 grs. |
| Density | 0.0407 gr./cc |
| Pressure[1] | 124.3 atms./sq. cm. |
| Temperature[1] | 1082° K. = 809° C. |
| Compression ratio | 31.33:1 |

[1]Calculation of these properties by Sears-Zemansky's equation are found in the computation section of Disclosure.

2. It is also assumed that the engine is in operation and that transfer cylinder 36 is filled with the exhaust air of the previous exhaust stroke of power producing cylinder 32, made up of 500 cc of compressed air with a mass of 17.55 grams (16.90 grams yielded by the air compartments 10, 16, 20 and 0.65 gr. from the ambient air); consequently, the thermodynamic properties in compartments 10-16-20 have been reduced to the following levels:

| | Air Compartments 10-16-20 |
|---|---|
| Volume of compressed air | 3,000 cc |
| Mass: 122.2 grs. - 16.9 grs. | 105.3 grs. |
| Density | 0.0351 gr./cc. |
| Pressure[1] | 100.9 atms./sq. cm. |
| Temperature[1] | 1021° K. = 748° C. |
| Compression ratio | 27:1 |

[1]Calculations of these properties by the Sears-Zemansky's equation on the computations section of Disclosure.

As mentioned, the Engine has an auxiliary electric motor powered by a battery to execute the initial admission and compression strokes.

1. Intake and Transference Strokes

With admission valve 50 open and with valves 58-62 closed, piston 38 of cylinder 32 starts its descending intake stroke powered by the auxiliary electric motor with battery. At the end of this stroke cylinder 32 will be filled with 500 cc of outside air; with the following thermodynamic properties:

| | |
|---|---|
| Volume of Cylinder | 500 cc. |
| Volume of air admitted | 500 cc. |
| Density of outside air | 0.0013 gr./cc. |
| Mass: D × V | 0.65 gr. |
| Pressure | 1 atmosphere/sq. cm. |
| Temperature (assumed) | 0° C. = 273° K. |

Simultaneously, piston 42 of transference cylinder 36 makes its upwards transference stroke with central transference valve 66 open but with exhaust valves 62-64 closed. The combined action of the rotary motion of blades 78 and of piston 42 will transfer the compressed air in cylinder 36 to air compartments 10-16-20.

It will be proved that the exhaust gases contain most of the heat energy supplied to cylinder 32 and that in the transference process compressor 78 returns to the exhaust gases the heat transformed to work, which is a fraction of the heat supplied to cylinder 32. As a result, compartments 10-16-20 receive back the mass and heat energy ceded and they attain their original thermodynamic properties previously calculated; and become ready for a subsequent work stroke. The excess mass or 0.65 gr. admitted from the outside into cylinder 32 during the previous intake stroke is returned to the surroundings through safety valve 28.

2. Compression and Work-Transference Strokes

With all valves closed, Cylinder 32 executes its upwards compression stroke with a compression ratio of 9:1; reducing the outside air admitted to a second volume of 55.56 cc. The new thermodynamic properties inside cylinder 32 at the end of the compression stroke are the following:

| | |
|---|---|
| Volume of compressed air | 55.56 |
| Mass | 0.65 gr. |
| Density: M ÷ V | 0.0117 gr./cc. |
| Pressure[1] | 21.67 atms./sq. cm. |
| Temperature[1] | 657.5° K. = 384° C. |
| Compression ratio | 9:1 |

[1]Calculations of these properties by Sears-Zemansky's equation on the Computations section of Disclosure.

Simultaneously, the combined action of the rotary motion of blades 78 and the descending movement of piston 42 form a partial vacumn that helps transfer the compressed air in power cylinder 34 to cylinder 36, cleaning cylinder 34 of all compressed air and preparing it for the following admission stroke. This process is performed with exhaust valve 64 open but with exhaust valve 62 and central transference valves 66 closed.

3. Work and Transference Strokes a. Work Stroke

At the end of Cylinder's 32 compression stroke; valve 58 of compressed air compartment 20 opens; and at this moment the compressed air compartments 10-16-20 get in contact with Cylinder 32. It is considered convenient to put side by side the thermodynamic properties of both the compressed air compartments 10-16-20 and of Cylinder 32 at the end of its compression stroke in order to facilitate the understanding of what happens during the next work stroke.

| Properties | Compartments 10-16-20 | Cylinder 32 |
|---|---|---|
| Mass of air | 122.2 grs. | 0.65 gr. |
| Density | 0.0407 gr./cc. | 0.0117 gr./cc. |
| Pressure | 124.3 atms./sq. cm.[1] | 21.67 atms./sq. cm.[1] |
| Temperature | 1082° K. = 809° C.[1] | 657° K. = 384° C.[1] |

[1]Calculations of these properties by the Sears-Zemansky equations appear in the Computations section of Disclosure.

Compressed air mass and heat energy will be transferred spontaneously and continuosly from compartments 10-16-20 to Cylinder 32 because the thermodynamic properties of the former are always higher than those of the latter; except when the work stroke finishes; at this movement they become equal. In order to understand what takes place in cylinder 32 during the work stroke; we have to imaginarily stop Cylinder's 32 piston when it reaches the bottom dead center and with valve 58 of compressed air compartments 10-16-20 still in open position.

Under these conditions we have a compressed air system comprising a volume of 3500 cc. (combined volumes of compartments 10-16-20 and Cylinder 32); containing a total compressed air mass of 122.85 grs. (mass of compartments 10-16-20 plus mass of Cylinder 32).

The thermodynamic properties of such compressed air system are the following:

| | |
|---|---|
| Volume | 3500 cc. |
| Mass | 122.85 grs. |
| Density: M ÷ V | 0.0351 grs./cc. |
| Pressure | 100.9 atms./sq. cm.[1] |
| Temperature | 1021° K. = 748° C.[1] |
| Compression ratio | 27:1 |

[1]Calculations of these properties by the Sears-Zemansky equation are found in the computation section of this report.

This means that under these circumstances compartments 10-16-20 and Cylinder 32 will be filled with compressed air having these properties. This also means that while compartments 10-16-20 experienced a decrease in pressure and temperature (from 124.3 atms./sq. cm. to 100.9 atms./sq. cm. and from 1082° K.=809° C. to 1021°K.=748° C.); Cylinder 32 experienced an increase in these properties from 21.67 atms./sq. cm. to 100.9 atms./sq. cm. and from 657° K.=348° C. to 1021° K.=748° C. This reduction in pressure and temperature of compartments 10-16-20 and gain in pressure and temperature by Cylinder 32 is the result of the continuous and spontaneous yielding of mass and heat energy by compartments 10-16-20; mass and heat that is spontaneously and continuously received by Cylinder 32.

This also means that at the end of the work stroke, Cylinder 32 will be filled with 500 cc. of compressed air with a density of 0.351 gr./cc. Consequently, the mass inside cylinder 32 is 17.55 grs. (500 cc.×0.0351 gr./cc.). As 0.65 gr. of this total came from the outside, then the mass ceded by compartments 10-16-20 to Cylinder 32 to execute the work stroke was 16.90 grs.

The density of the compressed air executing the work stroke is at all time 0.0351 gr./cc.; and this means that initially the amount of mass needed to achieve this density was 1.30 grs.; that tripled the mass to 1.95 grs. when Cylinder's 32 volume was 55.56 cc. From that moment on, compartments 10-16-20 provide eight aditional volumes of 55.56 cc. (totalling 444.44 cc.) of compressed air; each containing 1.95 grs. of compressed air mass. This subsequent transference of mass and heat does not increase the thermodynamic properties already formed: they just keep them constant. This subsequent mass and heat energy comprise eight nineths of the total mass and energy executing the work stroke: the other nineth is the heat transformed to mechanical work.

At the end of the work stroke, valve 58 of compartment 20 shuts; and the thermodynamic properties in both compartments 10-16-20 and cylinder 32 are presented in a tabular form as follows:

| Properties | Compartments 10-16-20 | Cylinder 32 |
|---|---|---|
| Volume | 3,000 cc. | 500 cc. |
| Mass of air | 105.30 grs. | 17.55 grs. |
| Density | 0.0351 grs./cc. | 0.0351 grs./cc. |
| Pressure | 100.9 ats./sq. cm. | 100.9 atms./sq. cm. |
| Temperature | 1021° K. = 748° C. | 1021° K. = 748° C. |
| Compression ratio | 27:1 | 27:1 |

b. Work-Heat Energy Analysis

Before we proceed any further, it is convenient to calculate the work performed during the work stroke; something that can be done by two simple equations. It has been proven that the work stroke is executed at a constant pressure of 100.9 atms./sq. cm., which is equivalent to 104.23 kilogrameters/sq. cm. (1.033 kg./atm.×100.9 atms./sq. cm.).

The equations to calculate work (W) are the following:

Force=pressure×area

Therefore:

Force=104.23 kgs.×50.0 sq. cms.=5211.485 kgs.

Work=Force×distance

As distance=10 cms./9×8=(8.889 cms./100 cms.)=0.089 meter

Therefore:

5211.485 kgs.×0.089 m.=463.243 kilogrameters

From Sears-Zemansky (Principles of Physics, Chapter 20, Second Law of Thermodynamics page 322) it is quoted:

> . . . The first law, it will be recalled, is a statement of the principle of conservation of energy, and merely imposes the restriction that one can obtain no more than 427.1[1/] kilograms of work from every kilocalory of heat.

[1/] 778 ft. lb. of work/Btu of heat=427.1 kilogrameters/kilocalory of heat.

Therefore the heat transformed to work is 1.085 kilocalory (463.243 kgms.÷427.1 kgms./kcal.). As the heat transformed to work is 1/9 of the total heat supplied, then the total heat supplied to execute the work stroke is 9.762 kilocalories; and 8/9 of that amount or 8.677 kcals. of heat remains in the exhausts. From Principles of Physics by Sears-Zemansky (Chapter 20 page 322, Second Law of Thermodynamics); it is quoted:

> Stack and friction losses account for only a small part; by far the largest part appearing as heat rejected in the exhaust. No one has ever constructed a heat engine which does not throw away in its exhaust a relatively larger fraction of the heat supplied to it; and it is safe to say that no one ever will. The impossibility of constructing an engine which with no other outstanding changes will convert a given amount of heat completely to mechanical work is a fundamental law of nature known as the Second Law of Thermodynamics.

c. Transference Stroke

Simultaneously, piston 42 of transference cylinder 36 performs its upwards transference stroke with central transference value 66 open but with exhaust valves 62-64 closed. The combined action of the rotary motion of blades 78 and of the ascending movement of piston 42 will transfer the compressed air in cylinder 36 to air compartments 10-18-22. The exhaust gases contain most of the heat energy previously supplied to cylinder 34 and in the transference process compressor 78 returns to the exhaust gases the heat transformed to work. As a result compartments 10-18-22 receive back the mass and heat energy ceded and they become ready for next work stroke. The excess mass or 0.65 gr. admitted during the previous intake stroke is returned to the environment through safety valve 30.

4. The Exhaust-Work Transference Stroke

As mentioned; at the end of the work stroke valve 58 of compartments 10-16-20 shuts. Simultaneously, exhaust valve 62 opens. The energy rich exhaust gases are drawn out of cylinder 32 by the upwards movement of piston 38 of cylinder 32; by the sucking action of blades 18 of rotary compressor 76 and by the descending motion of piston 42 of cylinder 36. This will extract all the exhaust gases from cylinder 32 preparing it for another admission stroke.

This completes a full cycle of operation of this operating unit of the engine; which is alternately repeated with that of the other unit made up by air compartments 10-18-22, power cylinder 34, transfer cylinder 36 and the associated valve means.

Comparison of the Proposed Engine and an Internal Combustion Replica From the Heat Energy Standpoint If the proposed Engine were an internal combustion engine, it would throw the energy rich exhaust gases to the surroundings because there is no way to recirculate them. By so doing, an internal combustion replica of subject Engine would be wasting 8/9 of the total energy supplied to execute the work stroke; equivalent to 8.677 kcals. of heat energy. Consequently, it will require another 9.762 kcals. to execute the following work stroke.

The proposed Engine collects the energy rich exhaust gases containing 8.677 kcals. of heat and the compressor exert mechanical work upon the mass of exhaust gases to transfer it back to central chamber 10 and from there to compartments 16-20. In the process, the compressor provides the 1.085 kilocalory of heat transformed to work.

In a tabular form, a heat energy analysis is made to compare the proposed Engine and an internal combustion replica:

| | Internal Combustion Replica | Subject Engine |
|---|---|---|
| Heat required to execute a work stroke | 9.762 kcals. | 9.762 kcals. |
| Heat transformed to work | 1.085 kcals. | 1.085 kcals. |
| Heat in exhaust | 8.677 kcals. | 8.677 kcals. |
| Heat wasted in exhaust gases | 8.677 kcals. | None |
| Heat required for next work stroke | 9.762 kcals. | 1.085 kcals. |

Engine's Acceleration-Deceleration

The work performed by the proposed engine was calculated in 423 kilogrameters of work for every power stroke. This work output is, however, at engine's full capacity. Power plants, when started, begin at low or idle speeds and from there they are accelerated through intermediate functional stages to full working performances. It is necessary, therefore, to determine subject Engine's idle functioning stage.

As previously, only the combined operation of power cylinder 32, transfer cylinder 36, air compartments 10-16-20 and associated valve means will be described, as the other operating unit works exactly the same, although at different times.

Cylinder 32 works at a compression ratio of 9:1 something that can not be altered. Compartments 10-16-20, as a compressed air system ready to work combinely with Cylinder 32, has a compression ratio of 31:33:1. This compression ratio is reduced to 27:1 when the work stroke of Cylinder 32 comes to an end. It can be increased and reduced from its lowest to its highest point and vice-versa if on the head of central chamber 10 there is placed an accelerating Valve-Throttle 84, comprising a valve 86 which may be of the flapper variety, pedally or manually operated, as by pedal and linkages 88, 90.

The Valve-Throttle 84 will be in open position when the pedal or manual lever 88 is on its highest-unpushed place, allowing the compressed air in central chamber 10 to exhaust out in such an amount as to permit Cylinder 32 to work on its normal compression ratio of 9:1. In that instant safety valve 28 does not work; as this valve functions when compartments 10-16-20 are at optimum thermodynamic conditions that permit the escape of the extra mass admitted during Engine's admission stroke. This extra mass of outside air (500 cc.=0.65 gr.) will always be admitted (as Engine keeps on working on its usual four stroke sequence) but in low gear operation all exhaust is performed by the accelerating throttle valve 84.

In case of an automobile, as the pedal 88 is pushed down it closes the accelerating-throttle valve, increasing the amount of air mass in chamber 10 and in compartments 16-20; with an accelerating effect on the engine. When the pedal is pushed down completely; the accelerating valve-throttle shuts; the air admitted from the outside during Engine's admission stroke accumulates in compartments 10-16-20 until maximum conditions are achieved; the engine works at full capacity and the extra mass is exhausted to the outside by safety valve 28.

Calculations made by the applicant indicates that the lowest compression ratio in compressed air compartments 10-16-20 to permit a low gear operation of Cylinder 32; is 10.33:1. With this compression ratio the thermodynamic properties of compartments 10-16-20 are the following:

| | |
|---|---|
| Volume of compartments 10-16-20 | 3,000 cc. |
| Compression ratio | 10.33:1 |
| Volume of air inside compartment: 3,000 cc. × 10.33 | 30990 cc. |
| Mass: V × D = 30990 cc. × 0.0013 gr./cc. | 40.287 grs. |
| Density: M ÷ V = 40.287 grs. ÷ 3,000 cc. | 0.0134 gr./cc. |
| Pressure[1] | 26.28 atms./sq. cm. |
| Temperature[1] | 694° K. = 421° C. |

[1]Calculated by Sears-Zemansky equation.

The thermodynamic properties of Cylinder 32 when at top dead center at the end of the compression stroke have been already calculated and are presented jointly with those of compartments 10-16-20 in a tabular form for the reader to understand the events that follow when these two compressed air systems get in contact.

| | Compartments 10-16-20 | Cylinder 32 |
|---|---|---|
| Volume | 3,000 cc. | 55.56 cc. |
| Mass of air | 40.287 grs. | 0.65 grs. |
| Density | 0.0134 gr./cc. | 0.0117 gr./cc. |
| Pressure | 26.28 atms./sq. cm. | 21.67 atms./sq. cm. |
| Temperature | 694° K. = 421° C. | 657.5° K. = 384.5° C. |
| Compression ratio | 10.33:1 | 9:1 |

The thermodynamic properties in compartments 10-16-20 are higher than those of Cylinder 32 and this will permit an spontaneous and continuous flow of mass and heat energy from compartments 10-16-20 to Cylinder 32 until the work stroke of the latter comes to an end. At this moment, we have to imaginarily stop piston 38 at its bottom dead center with valve 58 of compartments 10-16-20 open. The thermodynamic properties of such a system made up by compartments 10-16-20 and cylinder 32 are as follows:

| | |
|---|---|
| Volume: 3000 cc. +500 cc. | 3500 cc. |
| Mass: 40.287 grs. +0.65 gr. | 40.937 grs. |
| Density: M ÷ V | 0.0117 gr./cc. |
| Pressure[1] | 21.67 atms./sq. cm. |
| Temperature[1] | 657.5° K. = 384.5° C. |
| Compression ratio | 9:1 |

[1]Calculated by Sears-Zemansky-equation.

This analysis proves that the thermodynamic properties in Compartments 10-16-20 and in Cylinder 32 are the same at the end of the latter's work stroke. As spontaneous and continuous flow of mass and heat from the compartments to Cylinder 32 reduced the thermodynamic properties of the former but kept constant those of the latter. It is the applicant's opinion that this is subject Engine's low gear operation achieved by placing the accelerating-throttle valve 84 on central chamber 10.

At maximum working capacity, the compression ratio of chamber 10, cylinder 32 and compartments 10-16-20 is 27:1. Consequently the lowest and highest functional points of the proposed engine are represented by compression ratios of 10.33:1 and 27:1 respectively. The difference between these compression ratios represent the intermediate functional stages of subject Engine.

SUMMARY

The engine of this invention has to viewed from the following perspectives:

1. That the work stroke is performed by a spontaneous and continuous flow of mass and heat energy from compressed air compartments whose thermodynamic properties are always higher than those of the active cylinders until this process comes to an end but not by a combustion-contaminating process.
2. That it does not throw away the exhaust gases and consequently does not waste the major part of the heat supplied to the cylinder to execute the work stroke.
3. That in the transference process, the transfer cylinder and the compressor exert enough mechanical work upon the mass of exhaust gases to provide the heat energy transformed to work. As a consequence, the compressed air compartments receive back the mass and heat ceded; achieve their original thermodynamic properties and become ready for the following work stroke. The air mass received from the outside is returned to the surroundings through a safety valve.
4. That even if the compressor's battery is recharged with energy from a fuel, the operation of this engine will represent a substantial saving of fuel and of contamination.

Computations

The calculations of the thermodynamic properties of the motive fluid that executes the work stroke is a necessary requisite in the disclosure of inventions regarding compressed air engines. If the motive fluid properties are not predetermined; the work stroke is either not performed or executed deficiently.

Computations (1. thermodynamic properties of compartments 10-16-20 when filled with 3000 cc of air and; 2. as a compressed air system when 94,000 cc of air are squeezed inside them.)

1. Volume (V); Mass (M) and Density (D) are factors interelated by simple equations. Therefore:

$V=(M/D)$; or
$M=V\times D$; or
$D=(M/V)$

In the first table (compartments 10-16-20 as a normal air system, vertical figures); the density of air is given fact: Sears-Zemansky gives it as 0.0012929 gr./cc.; applicant rounds this figure to 0.0013 gr./cc. Consequently, the mass in compartments 10-16-20 when containing 3,000 cc. of air is 3.90 grs. (3,000 cc.×0.0013 gr./cc.).

2.

a. As a compressed air system, the mass in compartments 10-16-20 is the product of the total volume of air confined in them multiplied by 0.0013 gr./cc.; or 122.2 grs. The density of this mass when squeezed in compartments 10-16-20 is 0.0407 grs./cc. (122.2 grs.÷3,000 cc.).

b. Pressures and temperatures

In Principles of Physics (Chapter 19, Thermal Properties of Matter, page 307 included) Sears-Zemansky presents a problem which in metric terms is as follows:

> The compression ratio of a Diesel engine (V1/V2 is about 15. If the cylinder contains air at one atmosphere[1/] /sq. cm. (absolute) and 15° C. (288° K.) at the start of the compression stroke, compute the pressure and temperature at the end of this stroke. Assume that air behaves like an ideal gas and that compression is adiabatic. The value for the specific heat of air (Ψ) is 1.40.

[1] /In the text, Sears-Zemansky uses 15 lbs./sq. inch which is equal to 1.0207 atms./sq. cm.

In metric terms, the solution to Sears-Zemarsky's pressure problem is 44.31 atms./sq. cm.; equivalent to 651.2 lbs./sq. inch (44.31 atms./sq. cm.×14.696 lbs./sq. inch). This result is very similar to that of the text; the difference due to the rounding of figures. In metric terms; the solution to the temperature problem is 851° K. and 578° C.; equivalent to 1532° F. absolute and 1072° F. respectively; results very similar to those of the text.

In this disclosure compartments 10-16-20 are not a cylinder and does not have moving parts. It is considered as one having an area of 1,000 sq. cms. and an altitude of 94 cms.; for a volume of 94,000 cc. This first volume is reduced to a second one of 3,000 cc. by a sliding piston; or at a compression ratio of 31.33:1. By this logical reasoning compartments 10-16-20 are adapted to Sears-Zemansky's equations and their pressures and temperatures are calculated following the guides of a recognized authority.

The pressure inside compartments 10-16-20 as a compressed air system is calculated by Sears-Zemansky's equation as follows:

$$p2 = p1\left(\frac{V1}{V2}\right)^{\zeta}$$

$$\log p2 = \log p1 + \left(\zeta \times \log\frac{V1}{V2}\right)$$

$$= \log 1 + (1.40 \times \log 31.33)$$

$$= 0 + (1.40 \times 1.4959) = 2.0943$$

$$p2 = \text{antilog } 2.0943 = 1243$$

$$p2 = 124.3 \text{ atms./sq. cm.}$$

By Sears-Zemansky's equation, the temperature inside compartments 10-16-20 as a compressed air system is calculated as follows:

$$T2 = T1\left(\frac{V1}{V2}\right)\zeta - 1$$

$$\log T2 = \log T1 + \left(0.4 \times \log\frac{V1}{V2}\right)$$

$$= \log 273 + (0.4 \times \log 31.33)$$

$$= 2.4362 + (0.4 \times 1.4959)$$

$$= 2.4362 + 0.5987 = 3.0346$$

-continued $$T2 = \text{antilog } 3.0346 = 1082$$

$$T2 = 1082° \text{ K.} = 809° \text{ C.}$$

The pressures and temperatures have been computed by the Sears-Zemansky's equation following the same logical reasoning. The applicant considers unnecessary to repeat them.

What is claimed is:

1. A compressed air engine comprising:

(a). a reservoir of compressed air, (b). two power cylinders each containing a reciprocating piston connected to a crankshaft and flywheel, (c). a transfer cylinder which communicates with each power cylinder and the reservoir, and contains a reciprocating piston connected to the crankshaft, (d). valve means controlled by rotation of the crankshaft for supplying compressed air from the reservoir to each power cylinder and for exhausting compressed air from each power cylinder to the transfer cylinder, (e). valve means controlled by rotation of the crankshaft for supplying from the transfer cylinder to the reservoir compressed air supplied to the transfer cylinder on the exhaust strokes of the pistons of the power cylinders, and (f). an externally powered fan for assisting the exhaust of compressed air from each power cylinder to the transfer cylinder and from there to the compressed air reservoir.

2. A compressed air engine according to claim 1, in which the pistons of the power cylinders operate in the same direction at all times, and one power cylinder operates on an admission-compression-work-exhaust cycle and the other operates on a work-exhaust-admission-compression cycle.

3. A compressed air engine according to claim 1, in which the reservoir for each power cylinder has two sections of three compartments each (10-16-20 and 10-18-22), one of which (10) is common to both sections and is connected through valve means to the transfer cylinder and is also connected to each of the adjacent reservoir compartments (16-18) through a one-way outwardly opening valve (12-26), and the other two compartments of each section (20-22) are in communication with the adjacent compartments (16-18) by open ports and through valve means with the power cylinders (32-34).

4. A compressed air engine according to claim 3, in which the air compartments, the transfer cylinder and the power cylinders have the following volume ratios:

10:1

16–18:2

20–22:3

32–34:1

36:1

5. A compressed air engine according to claim 1, in which said reservoir has at least three sections, one of which is common to the other two and is connected through valve means to the transfer cylinder and connected to each of the other two sections through respective one-way outwardly opening valves, each of said other two sections being in communication through valve means with a respective power cylinder, a valve for controlling the flow of air between said one reservoir section and atmosphere, and means for selectively manually controlling said valve between opened and closed position to control the acceleration, deceleration and speed of said engine.

6. A reciprocating piston type compressed air operated engine, comprising:

(a). a crankshaft and a valve operating camshaft, (b). two power cylinders each having a piston operably connected to the crankshaft to move together in the cycle of operation of the engine, one being operable on an admission-compression-work-exhaust cycle and the other being operable on a work-exhaust-admission-compression cycle, (c). first and second reservoirs for air under pressure each of which is connected to one of the power cylinders, and a third reservoir for air under pressure connected to both of the two reservoirs, (d). a transfer cylinder connected to both of the power cylinders and to the third reservoir, and having a piston connected to the crankshaft for movement opposite to the movements of the power cylinder in the cycle of operation of the engine, and a piston connected to the crankshaft, (e). a fourth source of air under pressure powered externally to the engine, and connections from the source to the power cylinders and to the third reservoir and being operable during the operating cycle of the engine to remove air from the power cylinders on their exhaust stroke and supply air under pressure to the third reservoir, (f). and valve means operated by the camshaft for supplying air under pressure from the first and second reservoirs to the power cylinders, then exhausting air alternately from the power cylinders to the transfer cylinder assisted by air under pressure from the fourth source, and for transferring air under pressure from the transfer cylinder to the third reservoir and thence to the first and second reservoirs and thence to the power cylinders.

* * * * *